United States Patent
Bell (10) Patent No.: US 7,259,747 B2
(45) Date of Patent: Aug. 21, 2007

(54) INTERACTIVE VIDEO DISPLAY SYSTEM

(75) Inventor: Matthew Bell, Palo Alto, CA (US)

(73) Assignee: Reactrix Systems, Inc., Redwood City, CA (US)

( * ) Notice: Subject to any disclaimer, the term of this patent is extended or adjusted under 35 U.S.C. 154(b) by 589 days.

(21) Appl. No.: 10/160,217

(22) Filed: May 28, 2002

(65) Prior Publication Data

US 2002/0186221 A1 Dec. 12, 2002

Related U.S. Application Data

(60) Provisional application No. 60/296,189, filed on Jun. 5, 2001.

(51) Int. Cl.
*G09G 5/00* (2006.01)
*G09G 5/08* (2006.01)

(52) U.S. Cl. ............... 345/156; 345/157; 345/158; 345/159

(58) Field of Classification Search ........ 345/156–160, 345/174, 418–434, 471–475; 250/221; 348/140; 463/30–40
See application file for complete search history.

(56) References Cited

U.S. PATENT DOCUMENTS

| | | | |
|---|---|---|---|
| 4,843,568 A * | 6/1989 | Krueger et al. ............. 382/100 |
| 5,001,558 A | 3/1991 | Burley et al. |
| 5,138,304 A | 8/1992 | Bronson ..................... 340/707 |
| 5,239,373 A | 8/1993 | Tang et al. |
| 5,325,472 A | 6/1994 | Horiuchi et al. |
| 5,325,473 A | 6/1994 | Monroe et al. |
| 5,436,639 A | 7/1995 | Arai et al. |
| 5,510,828 A | 4/1996 | Lutterbach et al. |
| 5,528,263 A | 6/1996 | Platzker et al. ............. 345/156 |

(Continued)

FOREIGN PATENT DOCUMENTS

| | | |
|---|---|---|
| EP | 055366 | 7/1982 |
| EP | 626636 | 11/1994 |
| EP | 0913790 A1 | 5/1999 |
| JP | 57094672 | 6/1982 |
| WO | WO98/38533 | 9/1998 |
| WO | 2001/063916 | 8/2001 |

OTHER PUBLICATIONS

Penny et al.; TRACES: Wireless Full Body Tracking in the Cave; Dec. 1999; Japan; ICAT Virtual Reality Conference; http://turing.ace.uci.edu/pennytexts/traces/.

(Continued)

*Primary Examiner*—Vijay Shankar
(74) *Attorney, Agent, or Firm*—Carr & Ferrell LLP (57) ABSTRACT

A device allows easy and unencumbered interaction between a person and a computer display system using the person's (or another object's) movement and position as input to the computer. In some configurations, the display can be projected around the user so that that the person's actions are displayed around them. The video camera and projector operate on different wavelengths so that they do not interfere with each other. Uses for such a device include, but are not limited to, interactive lighting effects for people at clubs or events, interactive advertising displays, etc. Computer-generated characters and virtual objects can be made to react to the movements of passers-by, generate interactive ambient lighting for social spaces such as restaurants, lobbies and parks, video game systems and create interactive information spaces and art installations. Patterned illumination and brightness and gradient processing can be used to improve the ability to detect an object against a background of video images.

33 Claims, 7 Drawing Sheets

U.S. PATENT DOCUMENTS

| | | | |
|---|---|---|---|
| 5,528,297 A | 6/1996 | Seegert et al. | |
| 5,534,917 A | 7/1996 | MacDougall | |
| 5,591,972 A | 1/1997 | Noble et al. | 250/330 |
| 5,633,691 A | 5/1997 | Vogeley et al. | |
| 5,703,637 A | 12/1997 | Miyazaki et al. | |
| 5,882,204 A * | 3/1999 | Iannazo et al. | 434/251 |
| 5,923,380 A | 7/1999 | Yang et al. | |
| 5,953,152 A | 9/1999 | Hewlett | |
| 5,969,754 A | 10/1999 | Zeman | |
| 5,982,352 A * | 11/1999 | Pryor | 345/156 |
| 6,075,895 A * | 6/2000 | Qiao et al. | 382/218 |
| 6,084,979 A | 7/2000 | Kanade et al. | |
| 6,097,369 A | 8/2000 | Wambach | |
| 6,166,744 A * | 12/2000 | Jaszlics et al. | 345/629 |
| 6,176,782 B1 | 1/2001 | Lyons et al. | 463/36 |
| 6,198,487 B1 | 3/2001 | Fortenbery et al. | |
| 6,308,565 B1* | 10/2001 | French et al. | 73/379.04 |
| 6,335,977 B1 | 1/2002 | Kage | |
| 6,339,748 B1 | 1/2002 | Hiramatsu | |
| 6,353,428 B1 | 3/2002 | Maggioni et al. | |
| 6,400,374 B2* | 6/2002 | Lanier | 345/630 |
| 6,414,672 B2* | 7/2002 | Rekimoto et al. | 345/173 |
| 6,454,419 B2* | 9/2002 | Kitazawa | 353/122 |
| 6,501,515 B1* | 12/2002 | Iwamura | 348/734 |
| 6,598,978 B2* | 7/2003 | Hasegawa | 353/42 |
| 6,658,150 B2* | 12/2003 | Tsuji et al. | 382/218 |
| 6,720,949 B1* | 4/2004 | Pryor et al. | 345/158 |
| 6,747,666 B2 | 6/2004 | Utterback | |
| 7,042,440 B2 | 5/2006 | Pryor | |
| 7,069,516 B2 | 6/2006 | Rekimoto | |
| 2001/0012001 A1 | 8/2001 | Rekimoto et al. | |
| 2002/0041327 A1* | 4/2002 | Hildreth et al. | 348/42 |
| 2002/0064382 A1 | 5/2002 | Hildreth et al. | |
| 2002/0103617 A1 | 8/2002 | Uchiyama et al. | |
| 2002/0105623 A1 | 8/2002 | Pinhanez | |
| 2002/0178440 A1 | 11/2002 | Agnihorti et al. | |
| 2003/0093784 A1 | 5/2003 | Dimitrova et al. | |
| 2004/0046736 A1 | 3/2004 | Pryor et al. | |
| 2004/0046744 A1 | 3/2004 | Rafii | |

OTHER PUBLICATIONS

Simon Penny; "FUGITIVE"; 1995-7; http://www.ace.uci.edu/penny/works/fugitive/fugitive.html.

PLASMA; 3 pages; http://www.particles.de/paradocs/plasma/index.html.

Jeff Khan; Intelligent Room With a View; www.realtimearts.net.

Bodymover Body Movement as a Means to Obtain an Audiovisual, Spatial Experience 2000ART+COM AG Berlin; http://www.artcom.de/index.php?option=com_acprojects&page=6&id=Itemid=144&details=0&lang=en.

"R111, The Transformation From Digital Information to Analog Matter" http://www.r111.org.

"Supreme Particles; R111" URL:HTTP://WWW.R111.ORG, 1999, XP002989704.

ARTCOM: "Projekt Bodymover 2000; Koerperbewegung als Mittel zur Schaffung eines audio-visuellen Raum-Erlenbisses" <URL:HTTP://ARTCOM.DE/IMAGES/STORIES/2_PRO_BODYMOVER/BODYMOVER_D.PDF>, 2000, XP002989289.

Rekimoto, J. and Matsushita, N., "Perceptual Surfaces: Towards a Human and Human and Object Sensitive Interactive Display," 1997, Proc. of the Workshop on Perceptual User Interfaces, Banff, Canada, pp. 30-32.

Pinhanez, C., "The Everywhere Displays Projector: A Device to Create Ubiquitous Graphical Interfaces," 2001, Proc. of the UbiComp 2001 Conference, Ubiquitous Computing Lectures Notes in Computer Science, Springer-Verlag, Berlin, Germany, pp. 315-331.

Kjeldsen, R. et al., "Interacting with Steerable Projected Displays," 2002, Proc. of the 5th International Conference on Automatic Face and Gesture recognition, Washington, D.C.

Pinhanez, C. et al., "Ubiquitous Interactive Graphics," 2002, IBM Research Report RC22495, available at <http://www.research.ibm.com/ed/publications/rc22795.pdf>.

Ringel, M. et al., "Barehands: Implement-Free Interaction with a Wall-Mounted Display," 2001, Proc. of the 2001 ACM CHI Conference on Human Factors in Computing Systems (Extended Abstracts), pp. 367-368.

Sparacino, Flavia et al., "Media in performance: interactive spaces for dance, theater, circus and museum exhibits," 2000, IBM Systems Journal, vol. 39, No. 3-4, pp. 479-510.

Sparacino, Flavia, "(Some) Computer vision based interfaces for interactive art and entertainment installations," 2001, INTER—FACE Body Boundaries, Anomalie digital—arts, No. 2, Paris, France.

Leibe, Bastian et al., "Toward Spontaneous Interaction with the Perceptive Workbench, a Semi-Immersive Virtual Enviroment," Nov./Dec. 200, IEEE Computer Graphics and Apllications, vol. 20, No. 6, pp. 54-65.

Davis, J. W. and Bobick, A. F., "SIDEshow: A Silhouette-based interactive Dual-screen Enviroment," Aug. 1998, MIT Media Lab Tech Report No. 457.

Paradiso, Joseph et al., "New Sensor and Music Systems for Large Interactive Surfaces," 2000, Proc. of the Interactive computer Music Conference, Berlin, Germany, pp. 277-280.

Freeman, William et al., "Computer vision for interactive computer graphics,"May-Jun. 1998, IEEE computer Graphics and Applications, vol. 18, No. 3, pp. 41-53.

GroundFX Document, GestureTek ( Very Vivid, Inc.), description available online at <http://www.gesturetek.com/groundfx>.

Keays, Bill, "Using High-Bandwidth Input/Output in Interactive Art," Jun. 1999, Master's Thesis, Massachusetts Institute of Technology, School of Architecture and Planning.

Utterback, Camille and Achituv, Romy, "Text Rain," 1999, art installation, available online at <http://www.camilleutterback.com/textrain.html>.

Muench, Wolfgang, "Bubbles", 1999, Prix Ars Electronica Catalog 1999, Springer-Verlag, Berlin, Germany; available online at <http://hosting.zkm.de/wmuench/bub/text>.

Demarest, Ken, "Sand," 2000, Mine Control, art installation, available online at <http://www.mine-control.com>.

Sester, Marie, "Access," 2001, Interaction '99 Biennial Catalog, Gifu, Japan, available online at <http://www.accessproject.net/concept.html>.

Wellner, Pierre, "Interacting with paper on the DigitalDesk, " Jul. 1993, Communications of the ACM, Special issue on computer augmented enviroments: back to the real world, vol. 36, Issue 7, pp. 87-96.

Foerterer, Holger, "Fluidum," 1999, art installation, description available online at <http://www.foerterer.com/fluidum>.

Trefzger, Petra, "Vorwerk," 2000, art installation, description available online at <http://www.petracolor.de>.

Foeterer, Holger, "Helikopter," 2001, art installation, description available online at <http://www.foerterer.com/helikopter>.

Mandala Systems, "Video Gesture Control System Concept," 1986, description available online at <http://www.vividgroup.com/tech.html>.

Kreuger, Myron, "Videoplace," 1969 and subsequent, summary available online at <http://www.jtnimoy.com/itp/newmediahistory/videoplace>.

Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokaby/softVNS.html>.

Fujihata, Masaki, "Beyond Pages," 1995, art installation, description available online at <http://http://on1.zkm.de/zkm/werke/BeyondPages>.

Rogala, Miroslav, "Lovers Leap," 1994, art installation, Dutch Electronic Arts Festival, description available online at <http://http://wayback.v2.nl/DEAF/persona/rogala.html>.

Snibbe, Scott, "Boundary Functions," 1998, art installation, description available online at <http://snibbe.com/scott/bf/index.htm>.

Snibbe, Scott, "screen Series," 2002-2003, art installation, description available online at <http://snibbe.com/scott/screen/index.html>.

Keays, Bill, "metaField Maze," 1998, exhibited at Siggraph '99 Emerging Technologies and Ars Electronica 1999, description available online at <http://www.billkeays.com/metaFieldfosheet1A.pdf>.

Hemmer, Raphael Lozano, "Body Movies," 2002, art project/installation, description available online at <http://www.lozano-hemmer.com/eproyecto.html>.

Penny, simon et al., "Body Electric,"2003, art installation, description available online at <http://www.neuromech.northwestern.edu/uropatagium#ArtSci>.

Penny, Simon and Bernhardt, Andre, "Fugitive II," 2004, Australian Center for the Moving Image, art installation, description available online at <http://www.acmi.net.au/fugitive.jsp?>.

U.S. Appl. No. 11/507,976, filed on Aug. 21, 2006, Matthew Bell, Interactive Video Display System.

U.S. Appl. No. 10/737,730, filed on Dec. 12, 2003, Matthew Bell, Interactive Directed Light/Sound System.

U.S. Appl. No 10/974,044, filed on Oct. 25, 2004, Matthew Bell, Method and System for Processing Captured Image Information in an Interactive Video Display System.

U.S. Appl. No. 10/973,335, filed on Oct. 25, 2004, Matthew Bell, Method and System for Managing an Interactive Video Display System.

U.S. Appl. No. 10/866,495, filed on Jun. 10, 2004, Tipatat Chennavasin, Interactive Display System for Generating Images for Projection onto a Three-Dimensional Object.

U.S. Appl. No. 10/946,263, filed on Sep. 20, 2004, Matthew Bell, Self-Contained Interactive Video Display System.

U.S. Appl. No. 10/946,084, filed on Sep. 20, 2004, Matthew Bell, Self-Contained Interactive Video Display system.

U.S. Appl. No. 10/946,414, Matthew Bell, Sep. 20, 2004, Interactive Video Window Display System.

U.S. Appl. No. 11/083,851, Matthew Bell, filed on Mar. 18, 2005, Interactive Video Display System.

U.S. Appl. No. 11/197,941, filed on Aug. 5, 2005, Matthew Bell, Interactive Video Display System.

U.S. Appl. No. 11/106,898, filed on Apr. 15, 2005, Malik Coates, Method and System for State-Based Control of Objects.

U.S. Appl. No. 11/142,202, filed on May 31, 2005, Matthew T. Bell, System and Method for Sensing a Feature of an Object in an Interactive Video Display.

U.S. Appl. No. 11/142,115, filed on May 31, 2005, Steve Fink, Method and System for Combining Nodes into a Mega-Node.

U.S. Appl. No. 11/106,084, filed on Apr. 14,2005, Matthew t. Bell, Method ans System for Glare Resist Processing in an Interactive Video Display System.

U.S. Appl. No. 11/101,900, filed Apr. 8, 2005, John Paul D'India, Interactive Display System with Fluid Motion Visual Effect Capability.

U.S. Appl. No. 11/634,044, filed on Dec. 4, 2006, Matthew Bell, Systems and Methods for Communication Between a Reactive Video System and a Mobile Communication Device.

Elgammal, Ahmed et al., "Non-parametric Model for Background Subtraction," Jun. 2000, European Conference on Computer Vision, Lecture Notes on Computer Science, vol. 1843, pp. 751-767.

Lammarre, Mathieu and James J. Clark, "Background subtraction using competing models in the block-DCT domain," 2002, IEEE COMPUT SOC US, vol. 1, pp. 299-302.

Stauffer, Chris and W. Eric L. Grimson, "Learning Patterns of Activity Using Real-Time Tracking," Aug. 2000, IEEE Transaction on Pattern Analysis and Machine Intelligence, vol. 22, No. 8, pp. 747-757.

Harville, Michael et al., "Foreground Segmentation Using Adaptive Mixture Models in Color and Depth," 2001, Proc. of IEE Workshop on Detection and Recognition of Events in Video, pp. 3-11.

Kurapati, Kaushal et al., "A Multi-Agent TV Recommender," 2001, Workshop on Personalization in Future TV, pp. 1-8, XP02228385.

"EffectTV" Version 0.2.0 released Mar. 27, 2001, available online at <http://web.archive.org/web/20010101-20010625re_http://effectv.sourceforge.net>.

"Index of /EffecTV", available online at <http://effectv.cvs.sourceforge.net/effectv/EffecTV/?pathrev=rel_0_2_$_0$ >.

* cited by examiner

INTERACTIVE VIDEO DISPLAY SYSTEM

CROSS-REFERENCES TO RELATED APPLICATIONS

This application claims priority from co-pending U.S. Provisional Patent Application No. 60/296,189 filed Jun. 5, 2001 entitled INTERACTIVE VIDEO DISPLAY SYSTEM THAT USES VIDEO INPUT which is hereby incorporated by reference, as if set forth in full in this document, for all purposes.

BACKGROUND OF THE INVENTION

The present invention relates in general to image processing systems and more specifically to a system for receiving and processing an image of a human user to allow interaction with video displays.

Image processing is used in many areas of analysis, education, commerce and entertainment. One aspect of image processing includes human-computer interaction by detecting human forms and movements to allow interaction with images. Applications of such processing can use efficient or entertaining ways of interacting with images to define digital shapes or other data, animate objects, create expressive forms, etc.

Detecting the position and movement of a human body is referred to as "motion capture." With motion capture techniques, mathematical descriptions of a human performer's movements are input to a computer or other processing system. Natural body movements can be used as inputs to the computer to study athletic movement, capture data for later playback or simulation, enhance analysis for medical purposes, etc.

Although motion capture provides benefits and advantages, motion capture techniques tend to be complex. Some techniques require the human actor to wear special suits with high-visibility points at several locations. Other approaches use radio-frequency or other types of emitters, multiple sensors and detectors, blue-screens, extensive post-processing, etc. Techniques that rely on simple visible-light image capture are usually not accurate enough to provide well-defined and precise motion capture.

Some motion capture applications allow an actor, or user, to interact with images that are created and displayed by a computer system. For example, an actor may stand in front of a large video screen projection of several objects. The actor can move, or otherwise generate, modify, and manipulate, the objects by using body movements. Different effects based on an actor's movements can be computed by the processing system and displayed on the display screen. For example, the computer system can track a path of the actor in front of the display screen and render an approximation, or artistic interpretation, of the path onto the display screen. The images with which the actor interacts can be e.g., on the floor, wall or other surface; suspended three-dimensionally in space, displayed on one or more monitors, projection screens or other devices. Any type of display device or technology can be used to present images with which a user can control or interact.

In some applications, such as point-of-sale, retail advertising, promotions, arcade entertainment sites, etc., it is desirable to capture the motion of an untrained user (e.g., a person passing by) in a very unobtrusive way. Ideally, the user will not need special preparation or training and the system will not use unduly expensive equipment. Also, the method and system used to motion capture the actor should, preferably, be invisible or undetectable to the user. Many real-world applications must work in environments where there are complex and changing background and foreground objects, short time intervals for the capture, changing lighting conditions and other factors that can make motion capture difficult.

BRIEF SUMMARY OF THE INVENTION

The present invention permits interaction between a user and a computer display system using the user's (or another object's) movement and position as input to a computer. The computer generates a display that responds to the user's position and movement. The generated display can include objects or shapes that can be moved, modified, or otherwise controlled by a user's body movements.

In a preferred embodiment of the invention, displayed images are affected by a user's actions in real-time. The display can be projected around the user so that that the user's actions create effects that emanate from the user and affect display areas proximate to the user. Or the user can affect video objects such as by kicking, pushing, moving, deforming, touching, etc., items in video images. Interference between light used to display interactive images and light used to detect the user is minimized by using light of substantially different wavelengths.

In one embodiment, a user is illuminated with infrared light that is not visible to the human eye. A camera that is sensitive to infrared light is used to capture an image of the user for position and motion analysis. Visible light is projected by a projector onto a screen, glass or other surface to display interactive images, objects, patterns or other shapes and effects. The display surface can be aligned around the user so that their physical presence within the display corresponds to their virtual presence, giving the experience of physically touching and interacting with virtual objects.

One aspect of the invention can use patterned illumination instead of a simple, non-visible, uniform "floodlight." With patterned illumination, a pattern, such as a checkerboard, random dot pattern, etc., is projected. The pattern is used by processes executing on a computer to interpret a camera image and to detect an object from a background and/or other items in a scene. The pattern can be generated as a background (so that it does not impinge upon an object to be detected) or the pattern can be projected over all of the camera's viewable scene so that it illuminates background, foreground and objects to be detected and motion captured.

One way to achieve the patterned illumination includes using an infrared LED cluster or other non-visible light source in a slide projector. Another approach could use an infrared laser beam that is deflected, shuttered, scanned, etc., to produce a pattern.

Another way to achieve the patterned illumination is to use a regular "floodlight", but mark the aforementioned pattern onto the camera's viewable area using ink, dye, or paint that is either dark or highly reflective in the camera's receptive frequency. This ink, dye, or paint can be made invisible to the human eye so as to improve the aesthetics of the display.

Another aspect of the invention uses a gradient approach to determine object-image interaction. An "influence image" is created by creating a gradient aura, or gray scale transition, around a detected object. As the detected object moves, the gradient aura is calculated in real time. As the gradient aura impinges upon a video image or item, the brightness and gradient in the region of the impinged item is calculated.

The strength and direction of interaction (e.g., a pushing of the item) is a function of the brightness and gradient, respectively, of the impinged region.

In one embodiment the invention provides a system for detecting an object and generating a display in response, the system comprising a first source, for outputting electromagnetic energy in a first wavelength range, a detector for detecting a reflection of the first source of electromagnetic energy from an object, a processor coupled to the detector for using the detected reflection to generate a display signal, a second source, for outputting electromagnetic energy at a second wavelength range, wherein the second source generates a visible display in response to the display signal, wherein the first and second wavelength ranges are different.

In another embodiment the invention provides a method for detecting an object in an image captured with a camera, the method comprising using a patterned illumination to illuminate a background differently from the object; and using a processing system to define the object apart from the background.

In another embodiment the invention provides a method for computing an interaction of an object with a video item, the method comprising using a processor to determine a gradient for the object; using a processor to determine a boundary for the video item; and identifying an interaction by using the gradient and the boundary.

DETAILED DESCRIPTION OF THE INVENTION

Several configurations of the invention are described below. In general, the present invention uses a first light source to illuminate a user, or another object. The first light source uses light that is not visible to humans. For example, infrared or ultraviolet light can be used. A camera that is sensitive to light at the wavelength range of the first light source is used to detect a user who is illuminated by the first light source. A computer (or other processing system) is used to process the detected object image and to generate images for display. A second light source (e.g., a projector, video screen, etc.) is used to display the generated display images to a human user or viewers. The displayed images are at wavelengths that minimize interference with the camera's object detection. Typically, the visible spectrum is used to display the images.

In a preferred embodiment, the display surrounds the user such that the user's virtual presence is aligned with the user's physical presence. Thus, the virtual scene on the display has a physical location around the user, and the user's movement within the display will cause identical movement of the user's representation within the virtual scene. For example, the user can impinge on a virtual object's physical location and know that this will cause their virtual representation to touch the virtual object in the computer system. The use of the term "touch" or "touching" in this specification does not mean physical contact with an object, such as a person, and an image item. Rather the notion of touching means that the object's position and action in physical space is translated into an effect in a generated image, including effects of moving items in the generated images.

Displayed images or items can include objects, patterns, shapes or any visual pattern, effect, etc. Aspects of the invention can be used for applications such as interactive lighting effects for people at clubs or events, interactive advertising displays, characters and virtual objects that react to the movements of passers-by, interactive ambient lighting for public spaces such as restaurants, shopping malls, sports venues, retail stores, lobbies and parks, video game systems, and interactive informational displays. Other applications are possible and are within the scope of the invention.

Figure 1:
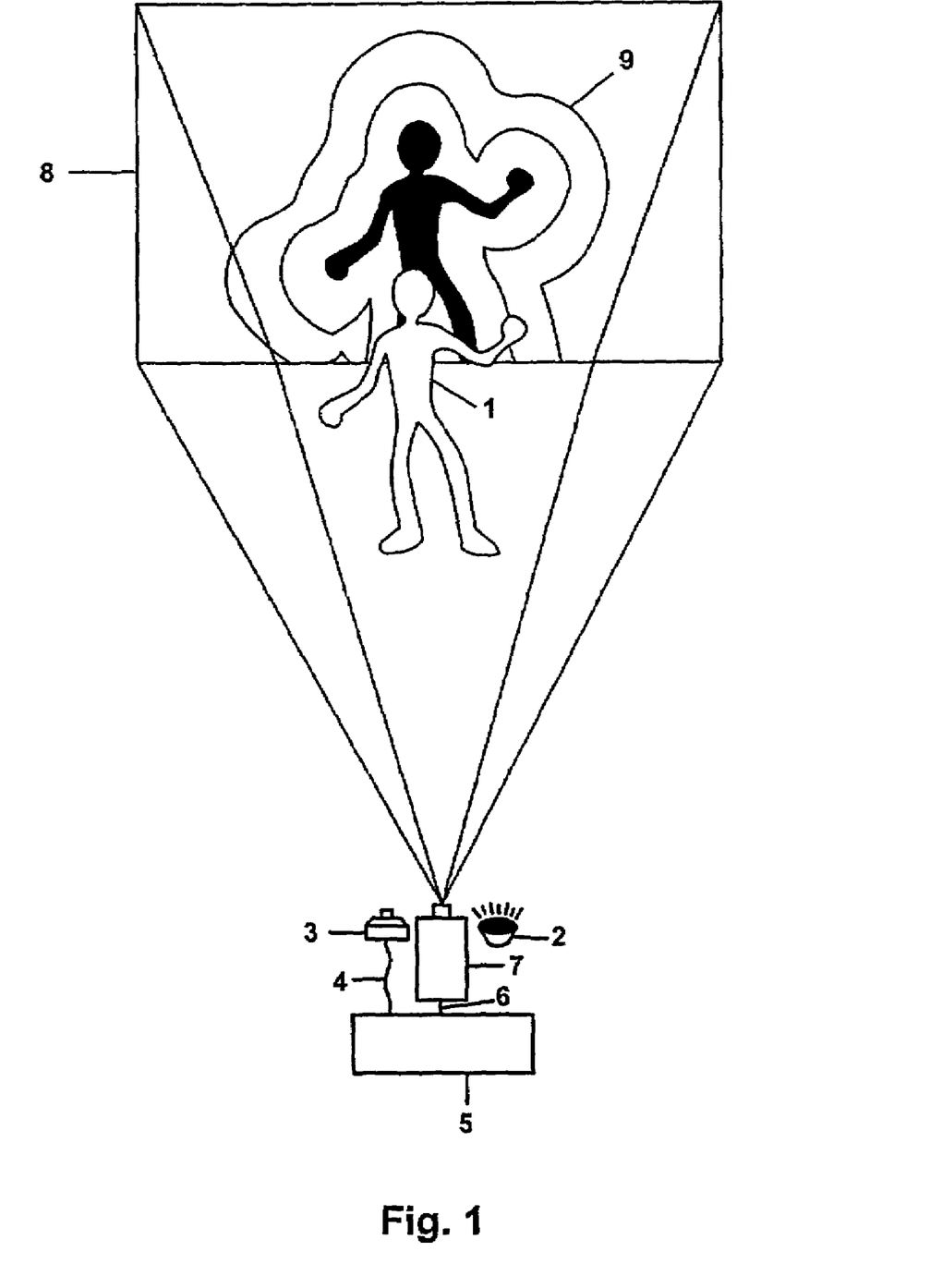
FIG. 1 shows a first configuration of a preferred embodiment using a co-located projector and camera.

FIG. 1 shows a front-projection embodiment of the invention using a co-located camera and projector. In FIG. 1, a person 1 is illuminated by an infrared (or other non-visible light) lamp 2. The image of the person is photographed by an infrared (or other non-visible light) camera 3. This signal is transmitted real-time 4 to computer 5. The computer performs the object detection algorithm, and generates the video effect in real time. The effect is transmitted 6 real-time to video projector 7. The projector projects the resulting image onto a screen 8 or some other surface. The video effect is then displayed 9 on the screen, in real time, and aligned with the person.

Figure 2:
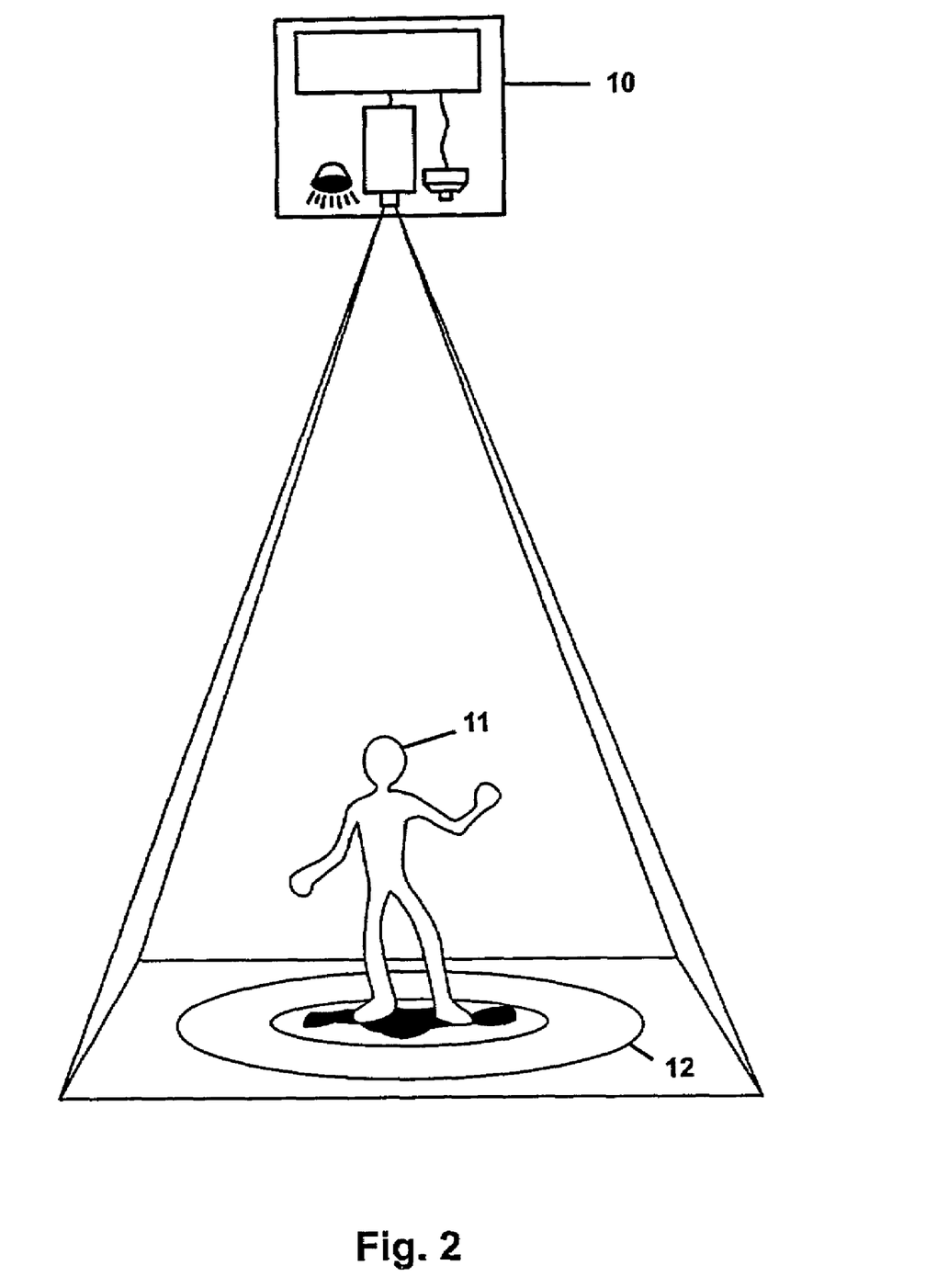
FIG. 2 shows an overhead projection configuration.

FIG. 2 shows an overhead projection configuration of the system. Component 10 includes the aforementioned system. Component 10 is shown mounted vertically here, but the camera, projector, and light source within 10 can also be mounted horizontally and then redirected downwards with a mirror. A person moving on the ground 11 can have the video signal projected onto the ground around them 12. The person's own shadow obscures a minimal amount of the image when the projector is directly overhead.

Figure 3:
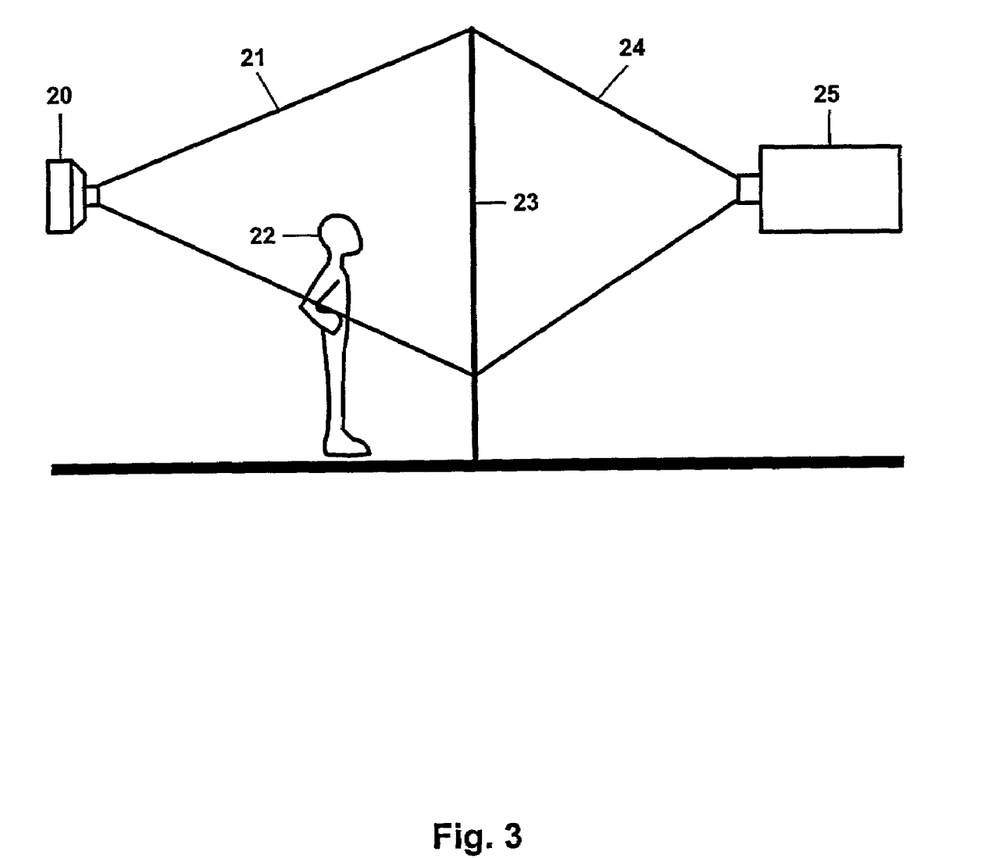
FIG. 3 shows a rear-projection configuration.
Figure 4:
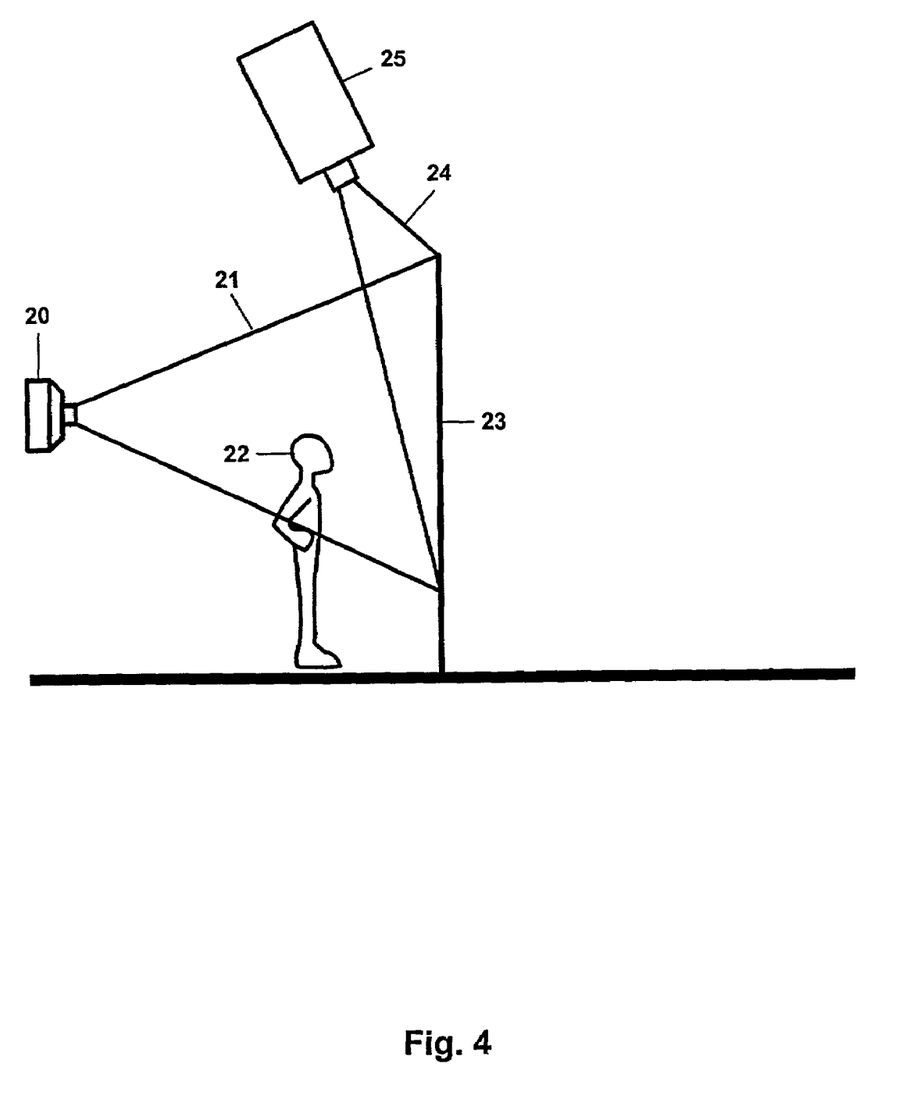
FIG. 4 shows a side-projection configuration.

FIGS. 3 and 4 show two more alternate configurations for the camera and projector. In both figures, camera 20 captures objects such as a person 22 in front of a screen 23. The angle viewed by the camera is shown at 21. In FIG. 3 projector 25 is placed behind the screen. The cast light from projector 24 can be seen on the screen from both sides. In FIG. 4, projector 25 is at an oblique angle to the screen; its light cone 24 is shown. Both of these configurations make it more likely that there are no shadows obstructing the projected image.

As described in the configurations, above, a video camera is used to capture the scene at a particular location for input into the computer. In most configurations of the device, the camera views part of the output video display. To prevent unwanted video feedback, the camera can operate at a wavelength that is not used by the video display. In most cases, the display will use the visible light spectrum. In this case, the camera must photograph in a non-visible wavelength, such as infrared, so that the video display output is not detected.

The scene being videotaped must be illuminated in light of the camera's wavelength. In the case of infrared, sources including sunlight, a heat lamp or infrared LEDs can be used to illuminate the scene. These lights can be positioned anywhere; however, the camera's view of spurious shadows from these lights can be minimized by placing the light source in proximity to the camera. A light source, such as one or more lights, can illuminate objects with a uniform lighting, as opposed to the patterned illumination discussed, below. In a preferred embodiment, the video signal is exported in real-time to the computer. However, other embodiments need not achieve real-time or near-real-time and can process object or video images (i.e., display images) at times considerably prior to displaying the images.

This component is designed to be modular; any computer software that utilizes the video input from the previous component and outputs the results to a video display can be used here.

Most instances of this component will have two parts: the first part handles the detection of mobile objects from static background, while the second part utilizes the object information to generate a video output. Numerous instances of each part will be described here; these instances are simply meant to be examples, and are by no means exhaustive.

In the first part, the live image from the video camera is processed real-time in order to separate mobile objects (e.g. people) from the static background, regardless of what the background is. The processing can be done as follows:

First, input frames from the video camera are converted to grayscale to reduce the amount of data and to simplify the detection process. Next, they may be blurred slightly to reduce noise.

Any object that does not move over a long period of time is presumed to be background; therefore, the system is able to eventually adapt to changing lighting or background conditions. A model image of the background can be generated by numerous methods, each of which examines the input frames over a range of time. In one method, the last several input frames (or a subset thereof) are examined to generate a model of the background, either through averaging, generating the median, detecting periods of constant brightness, or other heuristics. The length of time over which the input frames are examined determines the rate at which the model of the background adapts to changes in the input image.

In another method, the background model is generated at each time step (or more infrequently) by computing a weighted average of the current frame and the background model from the previous time step. The weight of the current frame is relatively small in this calculation; thus, changes in the real background are gradually assimilated into the background model. This weight can be tuned to change the rate at which the background model adapts to changes in the input image.

An object of interest is presumed to differ in brightness from the background. In order to find objects at each time step, the current video input is subtracted from the model image of the background. If the absolute value of this difference at a particular location is larger than a particular threshold, then that location is classified as an object; otherwise, it is classified as background.

The second part can be any program that takes the object/background classification of an image (possibly in addition to other data) as input, and outputs a video image based on this input, possibly in real time. This program can take on an infinite number of forms, and is thus as broadly defined as a computer application. For example, this component could be as simple as producing a spotlight in the shape of the detected objects, or as complicated as a paint program controlled through gestures made by people who are detected as objects. In addition, applications could use other forms of input, such as sound, temperature, keyboard input etc. as well as additional forms of output, such as audio, tactile, virtual reality, aromatic, etc.

One major class of applications includes special effects that use the object/background classification as input. For example, stars, lines, or other shapes could be drawn in the output video image in a random portion of the locations that were classified as "object". These shapes could then be set to gradually fade away over time, so that people leave transient trails of shapes behind them as they move around. The following are examples of other effects in the same class:

contours and ripples surrounding the objects
a grid which is deformed by the presence of objects
simulations of flame and wind, and other matrix convolutions applied to objects
special effects that pulse to the beat of the music, which is detected separately Another major class of applications allows the real objects to interact with virtual objects and characters. For example, an image showing a group of ducklings could be programmed to follow behind any real object (e.g. a person) that walks in front of the display.

In addition, computer games that can be played by people moving in front of the camera form another class of applications.

However, this list is not exclusive; this component is designed to be programmable, and thus can run any application.

The output of the processing software from the previous component is displayed visually. Possible displays include, but are not limited to video projectors, televisions, plasma displays, and laser shows. The displayed image can be aligned with the video camera's input range so that the video effects align with the locations of the people causing them. Since some configurations of the video camera can detect objects in non-visible light, the problem of the display interfering with the camera is avoided.

There are numerous possible configurations for the different components. For example, the camera and a video projector can be in the same location and pointed in the same direction The camera and projector can then be pointed at a wall as shown in FIG. 1, pointed at the ground, redirected with a mirror as shown in FIG. 2, or pointed at any other surface. Alternatively, the projector could be placed behind the screen as shown in FIG. 3 so that the display is identical to the one in FIG. 1, but the person is no longer in the way of the projection, so they do not cast a shadow. The shadow could also be avoided by placing the projector at an oblique angle to the screen as shown in FIG. 4. The video display could also be a large-screen TV, plasma display, or video wall. While the aforementioned configurations all have the video display lined up with the video input, this is not necessary; the video display could be placed anywhere. The preceding list is not exhaustive; there are numerous additional possible configurations.

The overall system can be networked, allowing vision information and processing software state information to be exchanged between systems. Thus an object detected in the vision signal of one system can affect the processing software in another system. In addition, a virtual item in the display of one system could move to other systems. If the displays of multiple systems are aligned together so that they form a single larger display, then the multiple systems can be made to function as if they were a single very large system, with objects and interactions moving seamlessly across display boundaries.

One common problem with the vision system is that, in cases where there is uncontrollable ambient illumination (e.g. sunlight) of the camera's viewable area from a significantly different angle than the camera, objects cast shadows onto the background. If these shadows are strong enough, the vision system may mistake them for objects. These shadows can be detected and removed by strobing the camera's light source. By subtracting a camera input image with ambient light alone from a camera input image with both the ambient light and the camera's light, the system yields an image that captures the scene as if only the camera's light were being used, thus eliminating the detectable shadows from the ambient light.

Additional accuracy in detecting objects with the images captured by the camera can be obtained by using patterned illumination or patterned markings.

One shortcoming of using a simple floodlight illumination system for computer vision is that if the colors of objects being viewed by the camera are very similar, then the objects can be very difficult to detect. If the camera operates in monochrome it is much more likely for the object and background to look the same.

Using a patterned object to cover camera's viewable area can improve object detection. If a pattern that contains two or more colors intermingled in close proximity is used, it is highly unlikely that other objects will have a similar look since at least one color of the pattern will look different from the color of surrounding objects. If a patterned object, such as a screen, is used as a background before which are the objects to be detected, then objects that pass in front of the patterned screen are more easily detected by the vision algorithm.

For example, in an infrared vision application the patterned object could be a background mat that appears white to the human eye, but contains a light & dark checkered pattern that is invisible to the human eye but visible to the camera. By using a pattern that is not in the visible light spectrum, the patterned mat will not interfere with the aesthetics of the system. The display system (e.g., projection video) can project output images onto the mat, as described above. A process executing on a processing system such as a computer system can be provided with the background pattern, thus making detection of an object in front of the mat easier, although the system could learn the patterned background in the same way that the vision algorithm learns any other background. Also, the ability of the system to adapt to changes in background light brightness would not be adversely affected.

A patterned illumination can also be projected from a light source onto the camera's viewable area. As long as the camera and invisible light source are in different, offset locations, parallax effects will cause the camera's view of the projected pattern to be distorted as objects move through the camera's viewing area. This distortion helps make objects that have similar colors stand out from each other. If the difference between the two images seen by the camera is taken, the result will show the shape of any object that has appeared, disappeared, or moved between the two images. If the image of an object in front of the background is subtracted from an image of the background alone, the result is an image that is zero where there is background and nonzero where there are other objects. This technique can be used in combination with other aspects of the invention discussed, herein.

A patterned light source can be achieved through several means. One method is to use an infrared light-emitting diode (LED) cluster or another non-visible light source in a slide projector. A set of lenses would be used to focus the light source through a slide containing the desired pattern, thus casting the pattern's image onto the camera's viewing area. In another method, an infrared laser beam could be shined onto a laser pattern generator or other scattering device in order to produce a light pattern on the camera's viewing area. Light can be deflected, shuttered, scanned, etc., in order to achieve a pattern. Many other approaches are possible.

A patterned light source is also useful for 3-D computer vision. 3-D computer vision techniques such as the Marr-Poggio algorithm take as input two images of the same scene taken from slightly different angles. The patterns on the images are matched up to determine the amount of displacement, and hence the distance from the camera, at each point in the image. The performance of this algorithm degrades when dealing with objects of uniform color because uniform color makes it difficult to match up the corresponding sections in the image pair. Thus, the patterned light source can improve the distance estimates of some 3D computer vision algorithms.

The two input images to these 3-D vision algorithms are usually generated using a pair of cameras pointed at the scene. However, it would also be possible to use only one camera. The second image could be an entirely undistorted version of the projected pattern, which is known ahead of time. This image of the pattern is essentially identical to what a second camera would see if it were placed at the exact same location as the patterned light source. Thus, the single camera's view and the projected pattern together could be used as an input to the 3-D vision algorithm. Alternatively, the second image could be an image of the background alone, taken from the same camera.

While many different kinds of patterns can be used, a high-resolution random dot pattern has certain advantages for both 2-D and 3-D vision. Due to the randomness of the dot pattern, each significantly sized section of the dot pattern is highly unlikely to look like any other section of the pattern. Thus, the displaced pattern caused by the presence of an object in the viewing area is highly unlikely to look similar to the pattern without the object there. This maximizes the ability of the vision algorithm to detect displacements in the pattern, and therefore objects. Using a regular pattern such as a grid can cause some difficulty because different sections of the pattern are identical, causing the displaced pattern to often look like the non-displaced pattern.

Figure 5A:
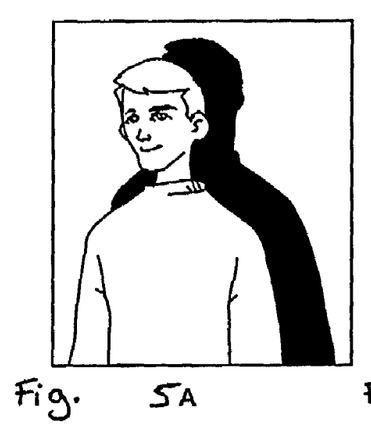
FIG. 5A illustrates a subject under uniform illumination.
Figure 5B:
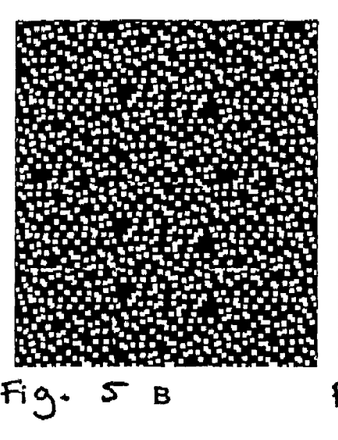
FIG. 5B illustrates a background under random dot pattern illumination.
Figure 5C:
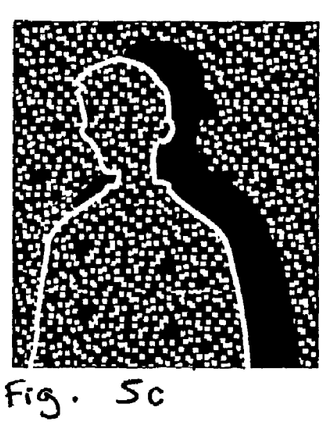
FIG. 5C illustrates a subject and background under random dot pattern illumination.
Figure 5D:
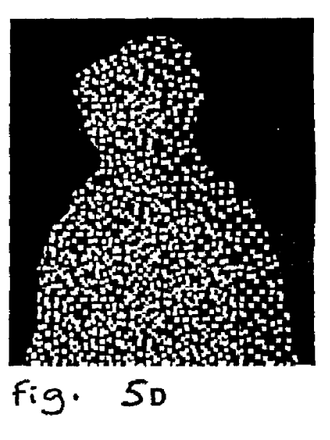
FIG. 5D shows a result of detecting a subject from a background using random dot pattern illumination.

FIGS. 5A–D show the usefulness of a random dot pattern in detecting an object. FIG. 5A shows a picture of a person under normal illumination. The person has a similar brightness to the background, making detection difficult. In FIG. 5B, a random dot pattern is projected onto the background from a light source near the camera. When the person stands in front of this pattern, the pattern reflected off of the person is displaced, as shown in FIG. 5C. By taking the difference between the images in FIGS. 5B and 5C, the image of FIG. 5D is obtained which defines the image area of the person with a strong signal.

Other approaches can be used to improve object detection. For example, a light source can be "strobed" or turned on-and-off periodically so that detection of shadows due to other light sources (e.g., ambient light) is made easier.

Once an object has been detected and defined the preferred embodiment uses a gradient aura to determine degree and direction of interaction of the object with a displayed image item.

Figure 6A:
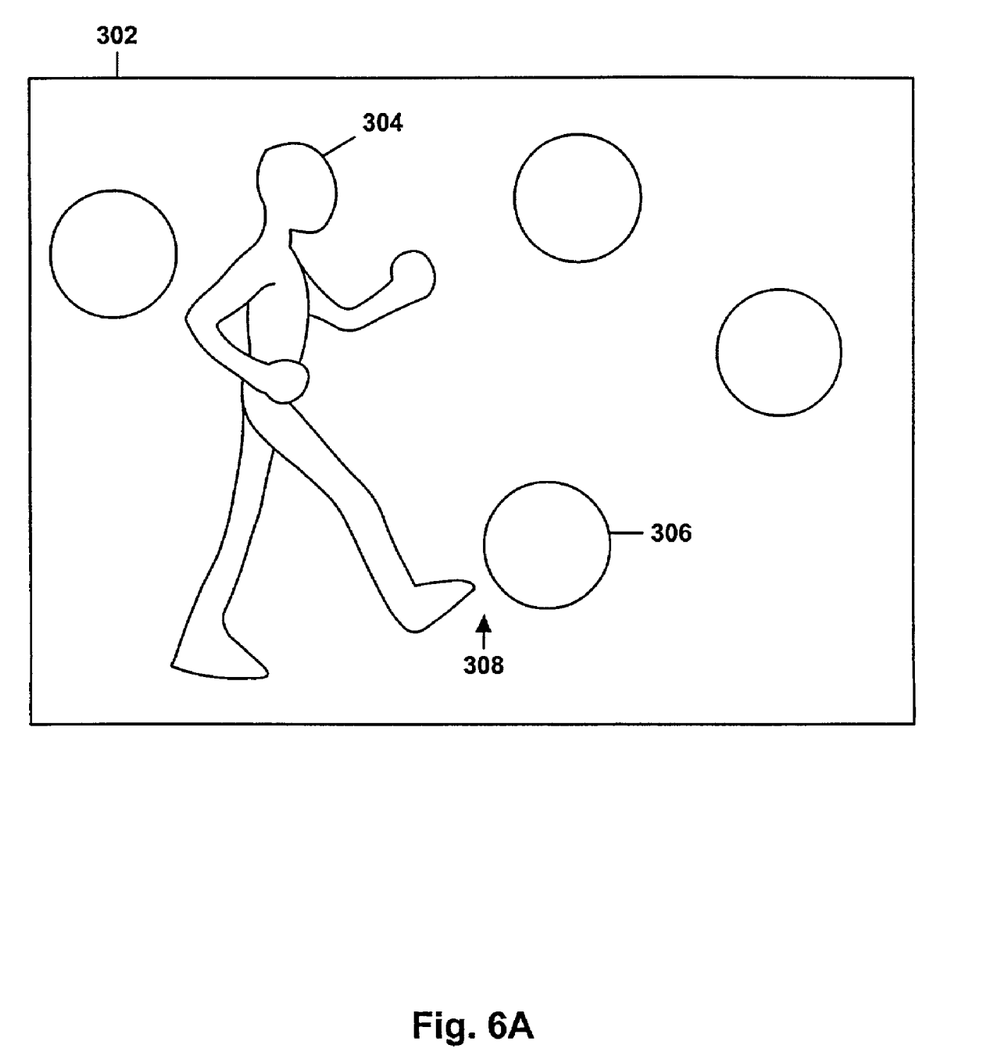
FIG. 6A shows a human user interacting with a video object.

FIG. 6A shows a human user interacting with a video object.

In FIG. 6A, object 304 has been detected and is shown in outline form. One representation of the object within a computer's processing can use the outline definition depicted in FIG. 6A. Video screen 302 displays several image items, such as image 306 of a ball.

Figure 6B:
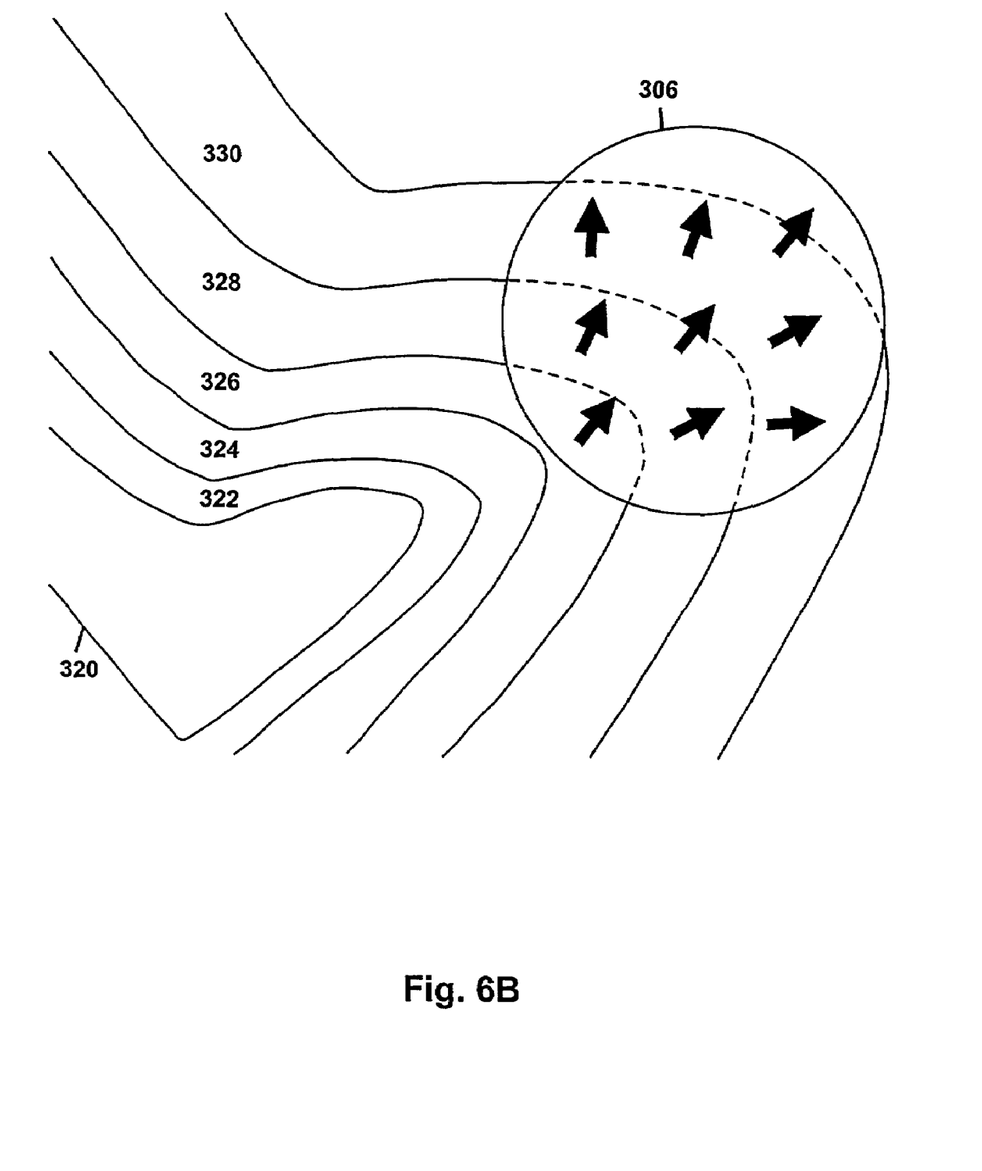
FIG. 6B illustrates an influence image.

FIG. 6B illustrates an influence image for the region of 308 of FIG. 6A.

In FIG. 6B, the outline image of the user's foot 320 and lower leg are used to generate successively larger outline areas. The original outline area 320's region is assigned a large pixel brightness value corresponding to white. Each successive outline area, 322, 324, 326, 328, 330 is assigned a progressively lower value so that a point farther away from the initial outline (white) area will have a lower pixel value. Note that any number of outline areas can be used. Also, the size and increments of outline areas can vary, as desired. For example, it is possible to use a continuous gradient, rather than discrete areas. The collection of all outline areas is referred to as the "influence image."

The influence image is compared to different image items. In FIG. 6B, ball item 306 impinges upon gradient areas 326, 328 and 330. As is known in the art, direction lines are determined in the direction of the gradient of the pixel value field for the impinged areas. FIG. 6B shows three example direction lines within item 306. The direction lines can be combined, e.g., by averaging, or a select single line can be used. The processing also detects that the brightest outline area impinged by the item is outline area 326. Other approaches are possible. For example, the brightness and gradient can be averaged over every point in the area of the image item, or on a subset of those points. Also, some embodiments can include duration of contact as a factor in addition to the brightness and gradient.

The interaction between an object, such as a person, and an item on the screen is computed using both the brightness of impinged outline areas and the direction as computed using one or more direction lines. The impinged brightness corresponds to the strength with which the user is "touching" the item. The gradient corresponds to the direction in (or from, depending on the sign of the calculation) which the item is being touched.

Although the invention has been discussed with reference to specific embodiments thereof, these embodiments are illustrative, not restrictive, of the invention. For example, although the preferred embodiments use a camera as a detector, different types of detection devices can be employed. The camera can be digital or analog. A stereo camera could be used in order to provide depth information as well as position. In cases where processing and display are not done in real time, film and other types of media can be used and followed up by a digital conversion before inputting the data to a processor. Light sensors or detectors can be used. For example, an array of photodetectors can be used in place of a camera. Other detectors not contemplated herein can be used with suitable results.

In general, any type of display device can be used with the present invention. For example, although video devices have been described in the various embodiments and configurations, other types of visual presentation devices can be used. A light-emitting diode (LED) array, organic LED (OLED), light-emitting polymer (LEP), electromagnetic, cathode ray, plasma, mechanical or other display system can be employed.

Virtual reality, three-dimensional or other types of displays can be employed. For example, a user can wear imaging goggles or a hood so that they are immersed within a generated surrounding. In this approach, the generated display can align with the user's perception of their surroundings to create an augmented, or enhanced, reality. One embodiment may allow a user to interact with an image of a character. The character can be computer generated, played by a human actor, etc. The character can react to the user's actions and body position. Interactions can include speech, co-manipulation of objects, etc.

Multiple systems can be interconnected via, e.g., a digital network. For example, Ethernet, Universal Serial Bus (USB), IEEE 1394 (Firewire), etc., can be used. Wireless communication links such as defined by 802.11b, etc., can be employed. By using multiple systems, users in different geographic locations can cooperate, compete, or otherwise interact with each other through generated images. Images generated by two or more systems can be "tiled" together, or otherwise combined to produce conglomerate displays.

Other types of illumination, as opposed to light, can be used. For example, radar signals, microwave or other electromagnetic waves can be used to advantage in situations where an object to detect (e.g., a metal object) is highly reflective of such waves. It is possible to adapt aspects of the system to other forms of detection such as by using acoustic waves in air or water.

Although computer systems have been described to receive and process the object image signals and to generate display signals, any other type of processing system can be used. For example, a processing system that does not use a general-purpose computer can be employed. Processing systems using designs based upon custom or semi-custom circuitry or chips, application specific integrated circuits (ASICs), field-programmable gate arrays (FPGAs), multiprocessor, asynchronous or any type of architecture design or methodology can be suitable for use with the present invention.

Thus, the scope of the invention is to be determined solely by the appended claims.

What is claimed is:

1. A system comprising:
a camera system operable to provide images of an object;
a display system operable to render video images onto a surface; and
a processor coupled to receive said images from said camera system and coupled to drive said display system, said processor operable to determine a strength and a direction of interaction between the object and at least one of the video images.

2. A system in accordance with claim 1, wherein said processor is further operable to determine an influence image that includes a region around an object image derived from the object, and wherein said strength and said direction of interaction are derived from said influence image.

3. A system in accordance with claim 2, wherein said processor is farther operable to determine a gradient of the influence image and to derive said direction of interaction based on said gradient.

4. A system in accordance with claim 3, wherein said processor is further operable to determine a brightness of the influence image and to derive said strength of interaction based on said brightness.

5. A system in accordance with claim 2, wherein said processor is further operable to determine a brightness of the influence image and to derive said strength of interaction based on said brightness.

6. A system in accordance with claim 1, wherein said interaction is the object pushing the at least one video image.

7. A system in accordance with claim 1, wherein said interaction is the object touching the at least one video image.

8. A system in accordance with claim 1, wherein said interaction is the object deforming the at least one video image.

9. A system in accordance with claim 1, wherein said interaction is the object manipulating the at least one video image.

10. A system in accordance with claim 1, wherein said processor is further operable to generate an adaptive model of a background to said object by analyzing changes over time in frames of the images from said camera system.

11. A system in accordance with claim 10, wherein said processor is further operable to generate said video images based on said adaptive model and said images from said camera system.

12. The system as described in claim 10 wherein said processor is further operable to generate said adaptive model of said background by identifying pixels in said frames having substantially constant brightness over time.

13. The system as described in claim 12 wherein said processor is further operable to generate said adaptive model of said background by computing median values over time for said pixels.

14. The system as described in claim 10 wherein said processor is further operable to generate said adaptive model of said background by computing median values over time for pixels in said frames.

15. The system as described in claim 10 wherein said processor is further operable to generate said adaptive model of said background by incorporating into said adaptive model of said background changes in said background that occur over time.

16. The system as described in claim 10 wherein said processor is further operable to generate said adaptive model of said background by incorporating into said adaptive model of said background changes in said background that occur due to changes in lighting affecting said background.

17. The system as described in claim 10 wherein said processor is further operable to generate said adaptive model of said background by creating a model image from said images from said camera system that classifies pixels in said model image as either foreground or background.

18. The system as described in claim 10 wherein said processor is further operable to generate said adaptive model of said background by incorporating into said adaptive model of said background information relating to at least a portion of said object that has remained substantially stationary for a period of time.

19. The system as described in claim 10 wherein said processor is further operable to generate said adaptive model of said background by computing a weighted average of a current frame of said images from said camera system with said adaptive model of said background.

20. The system as described in claim 19 wherein said processor is further operable to tune said weighted average to change a rate at which said model of said background adapts to changes in said images from said camera system.

21. The system as described in claim 10 wherein said processor is further operable to generate said display item by distinguishing between foreground that corresponds to said object and said background.

22. The system as described in claim 21 wherein said distinguishing comprises comparing a current frame of said images from said camera system with said adaptive model of said background.

23. The system as described in claim 22 wherein said distinguishing further comprises determining if differences between corresponding pixels in said current frame of said images from said camera system and said adaptive model of said background are greater than a threshold to determine location of said object.

24. The system as described in claim 10 wherein said camera system comprises two cameras to provide a stereo image, and wherein said processor is further operable to compute depth data based on said stereo image and to use said depth data to generate said model of said background.

25. A system in accordance with claim 1, wherein said camera system comprises a light source that is strobed.

26. A system in accordance with claim 25, wherein said processor is further operable to process said images from said camera system based on said strobed light source.

27. A system in accordance with claim 1, wherein said processor is further operable to detect a lighting phenomenon due to sources of light other than said camera system light source.

28. A system in accordance with claim 27, wherein said lighting phenomenon comprises shadows.

29. A system in accordance with claim 10, wherein at least a portion of said surface coincides with said background.

30. A system in accordance with claim 1, wherein said processor is further operable to detect said object and positions thereof.

31. A system in accordance with claim 1, wherein said video images comprise an advertisement.

32. A system in accordance with claim 1, wherein said processor is further operable to generate a display item having an animated characteristic.

33. A system in accordance with claim 32, wherein said processor is further operable to change said animated characteristic of said display item responsive to said interaction.

* * * * *